US007503114B2

(12) United States Patent
Tokunaga et al.

(10) Patent No.: US 7,503,114 B2

(45) Date of Patent: Mar. 17, 2009

(54) METHOD FOR PRODUCING INK JET HEAD

(75) Inventors: Hiroyuki Tokunaga, Kanagawa (JP); Osamu Kanome, Kanagawa (JP); Takehito Nishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 11/613,340

(22) Filed: Dec. 20, 2006

(65) Prior Publication Data

US 2007/0084054 A1 Apr. 19, 2007

Related U.S. Application Data

(62) Division of application No. 10/771,321, filed on Feb. 5, 2004, now Pat. No. 7,207,109.

(30) Foreign Application Priority Data

Feb. 7, 2003 (JP) ............................ 2003-031683
Feb. 4, 2004 (JP) ............................ 2004-028631

(51) Int. Cl.
*B21D 53/76* (2006.01)
*B41J 2/05* (2006.01)
*G01D 15/00* (2006.01)

(52) U.S. Cl. ....................... 29/890.1; 29/25.35; 29/832; 29/848; 29/856; 29/611; 347/65; 216/27

(58) Field of Classification Search ................ 29/890.1, 29/25.35, 832, 848, 856, 611; 216/27, 36; 347/65, 95, 68–72; 264/478, 477, 453, 37.33
See application file for complete search history.

(56) References Cited

U.S. PATENT DOCUMENTS 4,775,445 A 10/1988 Noguchi
5,030,317 A * 7/1991 Noguchi ...................... 216/27
5,458,254 A 10/1995 Miyagawa et al.
5,758,417 A 6/1998 Kobayashi et al.
5,821,962 A * 10/1998 Kudo et al. ................... 347/65
6,137,511 A 10/2000 Furuhata et al.
6,431,687 B1 8/2002 Wuu et al.
6,491,834 B1 * 12/2002 Kubota et al. ................. 216/27
2003/0098900 A1 5/2003 Tokunaga
2004/0021745 A1 2/2004 Mouri et al.

FOREIGN PATENT DOCUMENTS

JP 4-312852 11/1992
JP 9-123448 5/1997
JP 2000-246898 9/2000
JP 3168713 3/2001

* cited by examiner

*Primary Examiner*—David P Bryant
*Assistant Examiner*—Tai Nguyen
(74) *Attorney, Agent, or Firm*—Fitzpatrick, Cella, Harper & Scinto

(57) ABSTRACT

A method for producing an ink jet head including, on a substrate, a piezoelectric element for discharging an ink from a discharge port, and an ink flow path communicating with the discharge port so as to correspond to the piezoelectric element, the method comprising in this order a step of providing, on the substrate, a mold material corresponding to the ink flow path, a step of providing a wall material of the ink flow path so as to cover the mold material, a step of eliminating a portion of the substrate corresponding to the piezoelectric element thereby forming a space in the substrate, and a step of eliminating the mold material thereby forming the ink flow path.

7 Claims, 15 Drawing Sheets

METHOD FOR PRODUCING INK JET HEAD

This is a divisional application of application Ser. No. 10/771,321, filed Feb. 5, 2004, now pending.

BACKGROUND OF THE INVENTION

1. Field of the Invention

The present invention relates to a method for producing an ink jet head for discharging a liquid such as an ink by applying an energy to the liquid.

2. Related Background Art

A printer utilizing an ink jet recording apparatus is widely employed as a printing apparatus for a personal computer, because of a satisfactory printing performance and a low cost. In such ink jet recording apparatus, there have been developed, for example, a type generating a bubble in the ink by thermal energy and discharging the ink by a pressure wave caused by such bubble, a type sucking and discharging the ink by an electrostatic force, and a type utilizing a pressure wave caused by a vibrator such as a piezoelectric element.

Among the aforementioned ink jet recording apparatus, the type utilizing a piezoelectric element is provided with an ink flow path communicating with an ink discharge port, a pressure generating chamber corresponding to a piezoelectric element in such ink flow path, a piezoelectric element, for example, of a thin film type, provided corresponding to the pressure generating chamber, and a vibrating membrane to which the piezoelectric thin film is adjoined. An application of a predetermined voltage to the piezoelectric thin film causes an extension-contraction motion therein, whereby the piezoelectric film and the vibrating membrane integrally generate a vibration to compress the ink in the pressure generating chamber, thereby discharging an ink droplet from the ink discharge port.

In the field of ink jet recording apparatus, there is recently requested an improvement in the printing performance, particularly a higher resolution and a higher printing speed. For this purpose it is required to reduce an ink discharge amount each time and to execute a drive at a higher speed. For realizing these, Japanese Patent Application Laid-open No. H9-123448 discloses a method of reducing a volume of the pressure generating chamber, in order to reduce a pressure loss therein.

Also, though for a different object, Japanese Patent Publication No. 3168713 discloses an ink jet head employing Si {110} as a substrate and utilizing an Si {111} face for a lateral face of the ink pressure generating chamber. Also Japanese Patent Application Laid-open No. 2000-246898 discloses a head in which a piezoelectric element is provided in an area opposed to a cavity provided in a silicon substrate to secure a rigidity of a partition wall between the pressure generating chambers thereby preventing crosstalk.

In the prior technology, however, it is difficult to prepare an entire head including a piezoelectric element of a relatively high strength, and pressure generating chambers of a relatively small volume and a relatively small strength, in a simple manner with a high density and a high precision.

SUMMARY OF THE INVENTION

An object of the present invention is to provide a method for producing an ink jet head, capable of providing a relatively high strength in an entire head including a piezoelectric element, and forming a pressure generating chamber of a relatively small volume and a relatively low strength in a simple manner with a high density and a high precision.

Another object of the present invention is to provide a method for producing an ink jet head including, on a substrate, a piezoelectric element for ink discharge from a discharge port and an ink flow path communicating with the discharge port so as to correspond to the piezoelectric element, the method including, in this order, a step of providing a mold material, corresponding to the ink flow path, on the substrate, a step of providing a wall material for the ink flow path so as to cover the mold material, a step of eliminating a part of the substrate corresponding to the piezoelectric element thereby forming a space in the substrate, and a step of eliminating the mold material thereby forming the ink flow path, in this order.

According to the present invention, a dimensional precision of the pressure generating chamber of a relatively small volume can be controlled by a dimensional precision of the mold material. Also as the working on the substrate (elimination of a portion corresponding to the piezoelectric element) is executed in a state where the mold material is provided on the substrate, it is possible to prevent or reduce an influence of such work on the wall material of a relatively low strength. In this manner the pressure generating chamber can be prepared with a high precision.

Also according to the present invention, since a space is formed in the substrate by eliminating a part thereof corresponding to the piezoelectric element, the piezoelectric element has a high freedom of mechanical displacement. Therefore, a relatively small displacement induced by the piezoelectric element can efficiently result in an ink discharge.

Besides, since the piezoelectric element executing the mechanical displacement is supported by the substrate of a relatively high strength, the entire head including the piezoelectric element has a relatively high strength.

As explained above, the present invention has been attained by a composite combination of an ink flow path in which a high precision is preferentially desired, a piezoelectric element for which a freedom in the mechanical displacement is preferentially required, and a substrate for which a mechanical strength is preferentially requested.

Therefore, the present invention can provide a producing method for an ink jet head capable of providing a relatively high strength in an entire head including a piezoelectric element, and forming a pressure generating chamber of a relatively small volume and a relatively low strength in a simple manner with a high density and a high precision. It is thus made possible to produce a piezoelectric element-driven ink jet head of a high density by a simple process and with a high production yield. As a result, it is rendered possible to provide an ink jet head adaptive to various liquids and capable of high-quality printing.

In an embodiment of the present invention, a Si substrate of a face orientation {110} is anisotropically etched to form a space at a rear side of a vibrating plate of the substrate, thereby enabling a thinner and finer vibrating plate. Also by an anisotropic etching of the Si substrate with a face orientation {110}, a liquid supply aperture is formed simultaneously with the space, thereby shortening the process.

Also a formation of a liquid flow path and a liquid discharge port prior to the anisotropic etching allows to obtain a fine pitch of the discharge ports and to shorten the process.

Also a side wall of the space formed in the substrate is made substantially perpendicular to a principal face of the substrate prior to the space formation (parallel to Si {111} face), thereby allowing to obtain a head in which plural pressure generating chambers are arranged with a high density and a portion of the substrate between the spaces has a relatively high strength.

Also a wall member of the ink flow path is formed by a plating process to enable formation of the ink flow path in a simple manner with a high yield and a high precision.

DETAILED DESCRIPTION OF THE PREFERRED EMBODIMENTS

EXAMPLE 1

Figure 1:
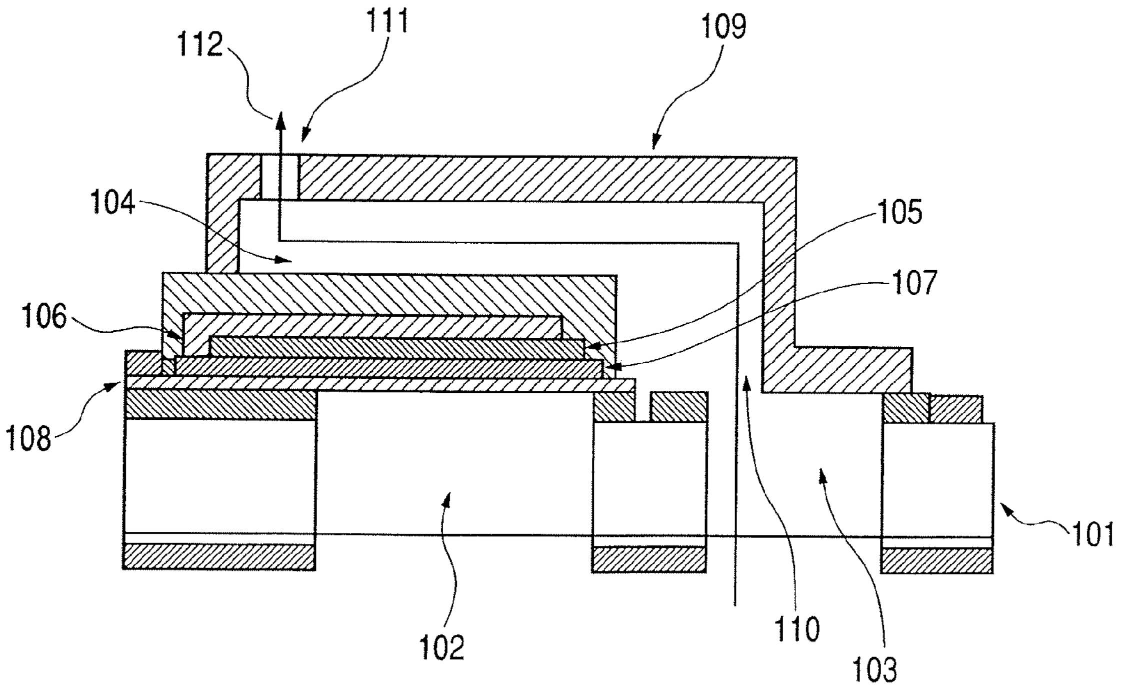
FIG. 1 is a schematic cross-sectional view showing an example of an ink jet head produced by a producing method of the present invention.

FIG. 1 is a schematic cross-sectional view showing an ink jet head produced by a producing method embodying the present invention. A Si {110} wafer is employed as a substrate. In the substrate, a hole 102 is formed by an anisotropic etching, in order to form a space behind a vibrating plate. Also a penetrating hole 103 is formed for supplying a liquid from the rear side. Above the hole 102 in the Si substrate, there are formed a vibrating plate 104, a piezoelectric thin film 105, an upper electrode 106, a lower electrode 107 and a protective film 108.

On the substrate, there is formed an individual pressure generating chamber 109. A material for the pressure generating chamber can be, for example, a resin, a photosensitive resin, a metal or ceramics. The pressure generating chamber is provided, at a right-hand end, with a communicating hole 110, which is connected with a common liquid chamber. At a left-hand end of the individual pressure-generating chamber, a liquid discharge port 111 is formed, and a liquid pushed by a deformation of the vibrating plate is discharged through a path 112 and is printed on a medium.

Though it is structurally possible to cause the vibrating plate to act on plural individual pressure generating chambers, it is desirable, in order to achieve a finer presentation in the ink jet recording, that presence or absence of liquid discharge can be independently controlled for each nozzle. Consequently there is preferred a configuration in which the vibrating plate is independent for each pressure generating chamber.

Figure 2:
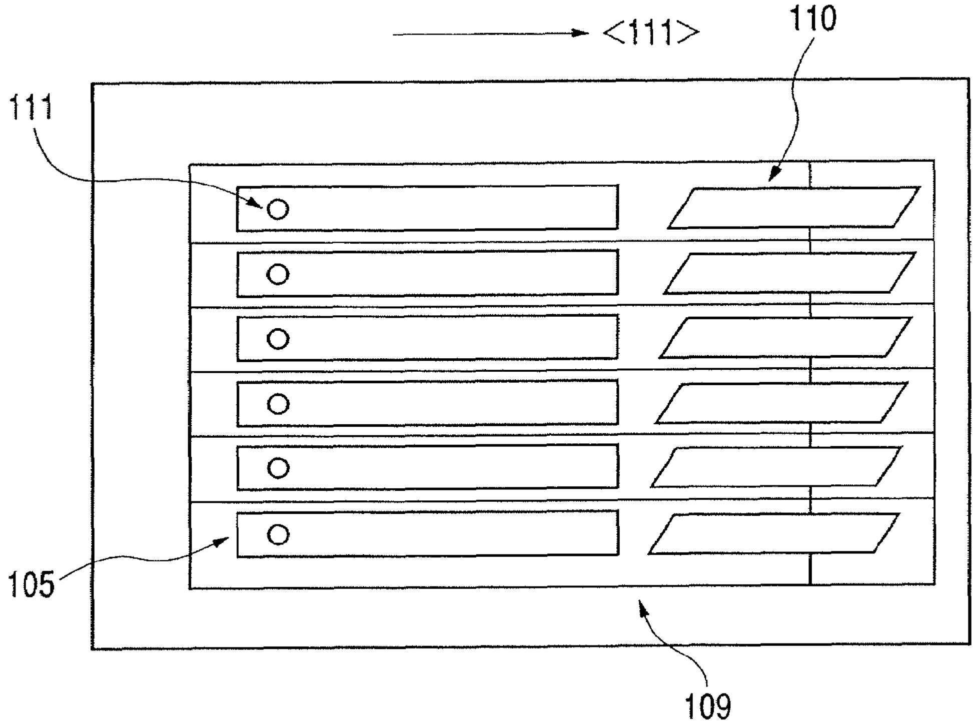
FIG. 2 is a schematic plan view showing an example of an ink jet head produced by a producing method of the present invention.
Figure 3:
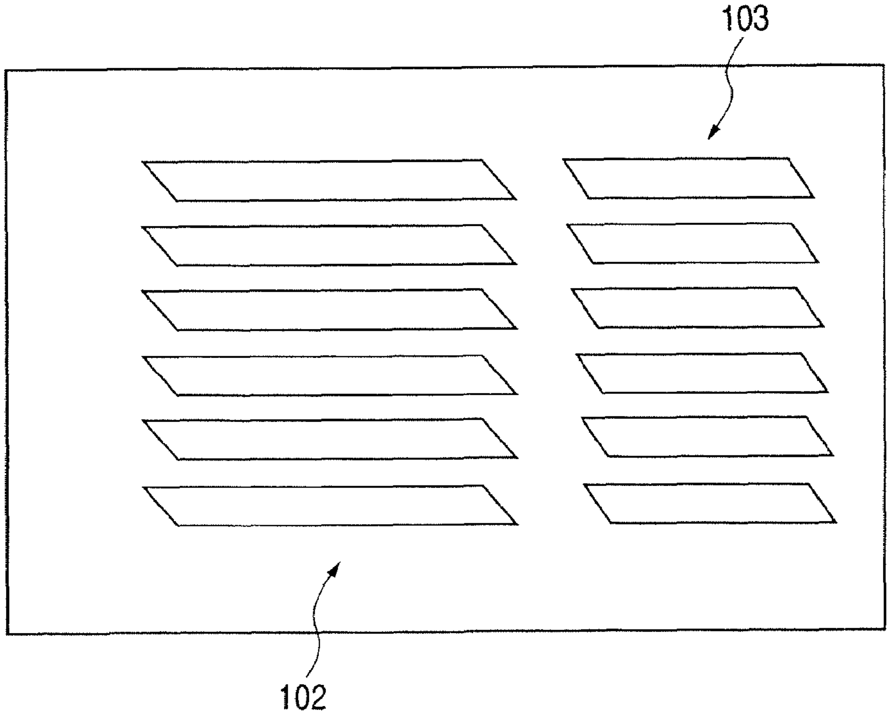
FIG. 3 is a schematic rear plan view showing an example of an ink jet head produced by a producing method of the present invention.

FIG. 2 is a schematic plan view (electrodes etc. being omitted) showing an ink jet head produced by the producing method of the present invention. Neighboring pressure generating chambers are arranged parallel, in a direction perpendicular to a Si {111} face. FIG. 3 is a schematic rear plan view thereof. The spaces 102 behind the vibrating plates and the liquid supply apertures 103 are so formed by etching, that longer sides of a parallelogram become parallel to the Si {111} face.

In the following, a process for producing an ink jet head according to the present invention will be explained in succession, with reference to FIGS. 4A to 9.

Figure 4A:
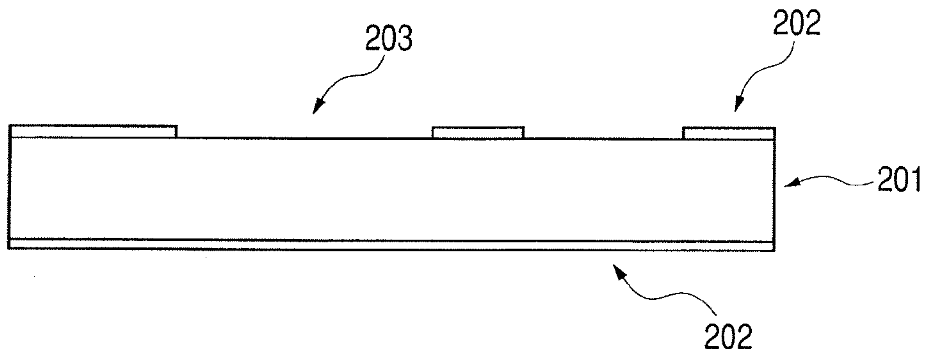
FIGS. 4A, 4B, 4C and 4D are views showing steps ((1)) to (4) in a flow of the method for producing the ink jet head of the present invention.

(1) On a silicon substrate 201 of a face orientation {110}, an insulation film 202 is formed for example by thermal oxidation or CVD, and a desired pattern 203 for forming the space behind the vibrating plate and the ink supply aperture is formed by a photolithographic process, as shown in FIG. 4A.

(2) A metal capable of withstanding a high temperature and showing a high etching rate to an anisotropic etchant such as TMAH (tetramethyl ammonium hydride), for example W or Mo, is deposited and patterned to form a sacrifice layer 204. When etching proceeds from the rear side and the etchant reaches the etching sacrifice layer, the sacrifice layer having a much higher etching rate than in the Si wafer can be etched within a short time, thereby providing an aperture corresponding to the pattern of the sacrifice layer. In order that the etched hole is formed perpendicularly to the substrate, the pattern is formed in a parallelogram shape with an acute included angle of 70.5° as shown in a plan view in FIG. 9, and longer sides and shorter sides of the parallelogram are arranged parallel to faces equivalent to {111}.

The sacrifice layer has a film thickness generally of 200 nm (2000 Å) or less, preferably 150 nm (1500 Å) or less, and most preferably 100 nm (1000 Å) or less.

(3) A SiN film is deposited by LPCVD as an etching stop layer 205 on the substrate surface. The etching stop layer may be formed by laminating two or more films in order to regulate a film stress.

The laminated etching stop film has a total film thickness generally of 200 nm to 2 μm, preferably 300 to 1500 nm and most preferably 400 to 1300 nm. Also the laminated etching stop film has a total stress generally of $2\times10^{-10}$ Pa or less, preferably $1.8\times10^{-10}$ Pa or less, and most preferably $1.5\times10^{-10}$ Pa or less.

(4) A $SiO_x$ film is deposited as a protective film 206, for example by plasma CVD or thermal CVD.

(5) A lower electrode 207 is formed with a metal capable of withstanding a high temperature such as Pt/Ti, in alignment with the sacrifice layer constituting a rear part of a vibrating plate.

(6) On such electrode, a thin film for example of lead titanate-zirconate (PZT) is deposited for example by sputtering and patterned to form a piezoelectric member 208, which is annealed at a high temperature of about 700° C. in order to secure a piezoelectric property.

(7) On the piezoelectric member, an upper electrode 209 is formed with a metal capable of withstanding a high temperature, such as Pt.

(8) On thus formed piezoelectric element, a $SiO_x$, film is deposited for example by plasma CVD to form a vibrating plate 210.

(9) An anticorrosive resin film 211 is formed in order to improve adhesion of a nozzle of a resinous material and to protect the rear surface from an etchant.

(10) A pattern 212 is formed with a resin soluble with a strong alkali or an organic solvent, in order to secure a pressure generating chamber and a liquid flow path. This pattern is formed by a printing method or by a patterning with a photosensitive resin. Such flow path forming resin has a thickness generally of 15 to 80 μm, preferably 20 to 70 μm and most preferably 25 to 65 μm.

(11) A covering resin layer 213 is formed on the pattern of the liquid flow path. The covering resin layer is preferably constituted of a photosensitive resist, in order to form a fine pattern, and is required to be not deformed nor denatured by alkali or solvent which is used for removing the resin layer constituting the flow path.

Then the covering resin layer on the flow path is patterned to form a liquid discharge port 214 and external connecting parts for the electrodes. Thereafter the covering resin layer is hardened by light or heat.

(12) A protective film 215 is formed with a resist material, in order to protect a nozzle forming side of the substrate.

(13) SiN or $SiO_2$ on the rear surface is eliminated by a photolithographic method, in a pattern portion of the rear part of the vibrating plate and the liquid supply aperture on the rear surface, thereby exposing the wafer surface. Such pattern is formed in a mirror image relationship to the sacrifice layer as shown in FIG. 3.

Then an etching leading hole 216 is formed in a vicinity of an acute angle (rear plan view in FIG. 9) of the parallelogram on the rear surface. For this purpose there is generally utilized a laser working, but a discharge working or a blasting may also be employed.

The leading hole is formed to a depth as close as possible to the etching stop layer. A depth of the leading hole is generally 60% or more of the thickness of the substrate, preferably 70% or more and most preferably 80% or more. However it should not penetrate the substrate. The leading hole suppresses an inclined {111} face generated from the acute angle of the parallelogram at the anisotropic etching.

This leading hole is not necessarily needed since the leading hole might make the control of width of opening portion difficult upon etching.

(14) The substrate is immersed in an alkaline etchant (KOH, TMAH, hydrazine etc.), thus being anisotropically etched so as to expose a {111} face, whereby Si penetrations of a parallelogram planar shape are formed to constitute a space 217 behind the vibrating plate and a liquid supply aperture 218.

(15) The film such as of SiN of the etching stop layer 205 is locally eliminated by a chemical such as fluoric acid or by dry etching to open the liquid supply aperture.

(16) Protective resist material is removed.

(17) The liquid flow path forming material 210 is removed to secure a liquid flow path 221

In the above-explained process, the working procedure on the substrate is not particularly limited but can be arbitrarily selected.

Also in the above-described process, the liquid discharge port is formed by patterning the covering resin layer, but it is also possible to adopt a method of adhering a member separately worked and having a liquid discharge port onto a substrate on which a piezoelectric element is formed.

An example of thus obtained ink jet head will be explained with reference to FIG. 1. FIG. 1 is a schematic cross-sectional view of an ink jet head embodying the present invention. As the substrate, there was employed a Si {110} wafer of a thickness of 635 μm. On the substrate, in order to form a space behind the vibrating plate, a hole 102 was formed by anisotropic etching. Also a penetrating hole 103 for liquid supply from the rear surface was formed at the same time.

Above the hole 102 in the Si substrate, $SiO_2$ was deposited with a thickness of 4 μm and patterned as a vibrating plate 104. As a piezoelectric thin film 105, PZT was deposited with a thickness of 3 μm and was patterned. An upper electrode 106 was formed by depositing Pt by 200 nm (2000 Å) followed by patterning. A lower electrode 107 was formed by depositing Pt/Ti laminated films by 200/100 nm (2000/1000 Å) followed by patterning. As a protective film 108, $SiO_2$ was deposited by 200 nm (2000 Å) and patterned.

On the substrate, an individual pressure generating chamber 109 was formed. A photosensitive resin shown in Table 1 was employed as the material of the pressure generating chamber. The pressure generating chamber had a height of an internal wall of 50 μm, and a wall thickness of 10 μm. At an end of the pressure generating chamber, there was formed a communicating hole 110 for communication with a common liquid chamber 103.

At the opposite end of the individual pressure generating chamber, a liquid discharge port 111 of a diameter of 26 μmΦ was formed, whereby the liquid pushed out by a deformation of the vibrating plate was discharged through a path 112 and printed on a medium.

FIG. 2 is a plan view of the substrate (electrodes etc. being omitted) 150 neighboring pressure generating chambers were arranged in parallel in a direction perpendicular to the Si {111} face. The array of the nozzles had a pitch of 84.7 μm.

FIG. 3 is a rear plan view. Spaces 102 behind the vibrating plate and liquid supply apertures 103 were formed by etching, in such a manner that the longer sides of parallelogram become parallel to the Si {111} face. The space behind the vibrating plate had a length of 700 μm along the longer side, and the liquid supply aperture had a length of 500 μm along the longer side.

This head was used with an aqueous ink of a viscosity of 2 mPa·s (=2 cp) and a high-quality print without discharge failure could be obtained under conditions of 25 kHz, a liquid droplet of 12 pl and a width of 12.5 mm.

EXAMPLE 2

Another example of the producing method for the ink jet head of the present invention will be explained in succession with reference to FIGS. 4A to 9.

(1) On a silicon substrate 201 of an external diameter of 150 mmϕ, a thickness of 630 μm and a face orientation of {110}, a $SiO_2$ film 202 was formed by 600 nm (6000 Å) by thermal oxidation, and a desired pattern 203 for forming a space behind the vibrating plate and a liquid supply aperture was formed by a photolithographic process, as shown in FIG. 4A. (FIG. 4A)

Figure 4B:
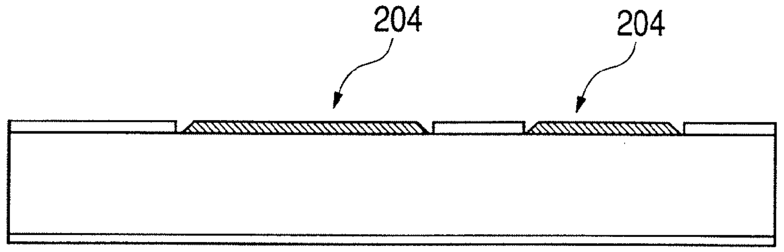

(2) Polysilicon was deposited by 300 nm (=3000 Å) by LPCVD and was patterned to form a sacrifice layer 204. The sacrifice layer for forming the space behind the vibrating plate had a length of 700 μm and a width of 60 μm, and was arranged in 150 units with a pitch of 84.7 μm. The sacrifice layer for forming the liquid supply aperture had a length of 500 μm, and other parameters were made same as those for the aforementioned sacrifice layer. (FIG. 4B)

In order that the etched hole could be formed perpendicularly to the substrate, the pattern was formed in a parallelogram shape with an acute included angle of 70.5°, and longer sides and shorter sides of the parallelogram were arranged parallel to faces equivalent to {111}. (FIG. 4B)

Figure 4C:
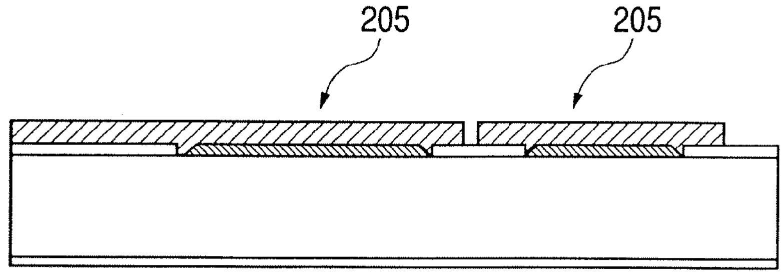

(3) A SiN film was deposited by 800 μm (=8000 Å) by LPCVD as an etching stop layer 205 on the substrate surface. (FIG. 4C)

Figure 4D:
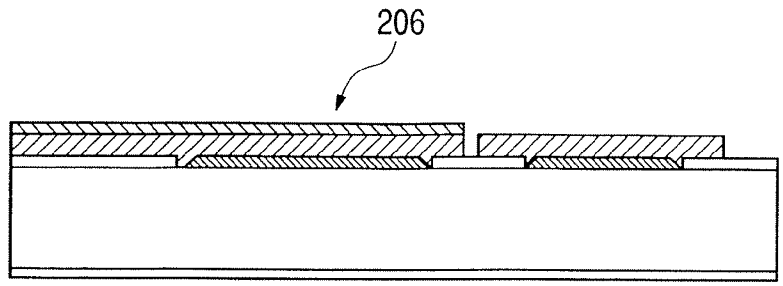

(4) A $SiO_x$ film was deposited by 150 nm (=1500 Å) by low pressure CVD as a protective film 206. (FIG. 4D)

Figure 5A:
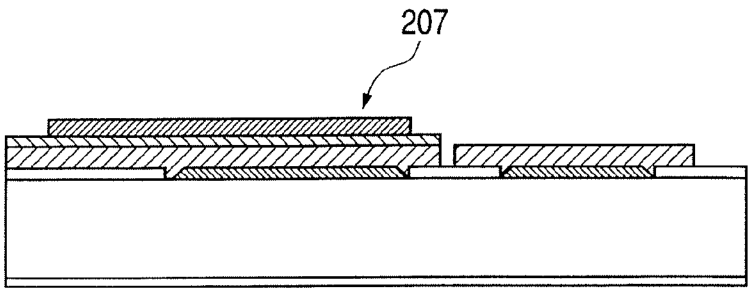
FIGS. 5A, 5B, 5C and 5D are views showing steps (5) to (8) in a flow of the method for producing the ink jet head of the present invention.

(5) Pt/Ti laminated films of 200/100 nm (2000/1000 Å) were deposited and patterned to form a lower electrode 207. (FIG. 5A)

Figure 5B:
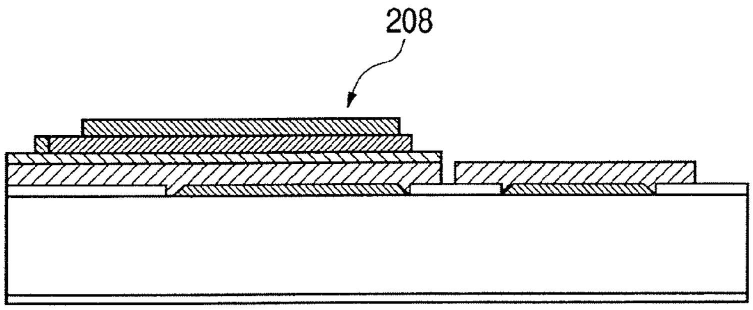

(6) On such electrode, a thin film for example of lead titanate-zirconate (PZT) was deposited by sputtering and patterned to form a piezoelectric member 208. (FIG. 5B)

Figure 5C:
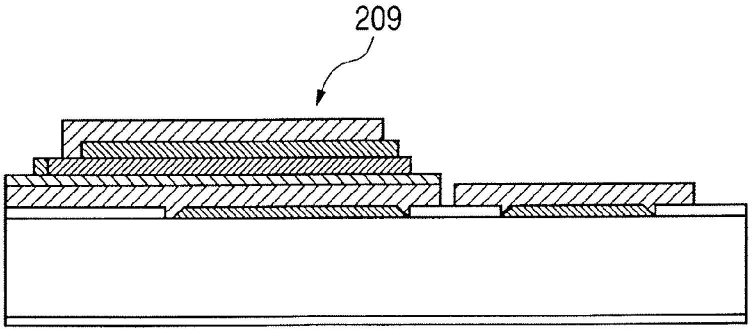

(7) On the piezoelectric member, Pt was deposited by 200 nm (=2000 Å) and patterned to form an upper electrode 209. (FIG. 5C)

Figure 5D:
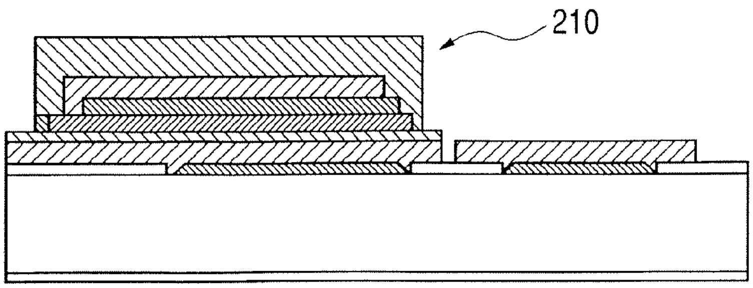

(8) On thus formed piezoelectric element, a $SiO_{x\,film\,of}$3 μm was deposited by plasma CVD to form a vibrating plate 210. (FIG. 5D)

Figure 6A:
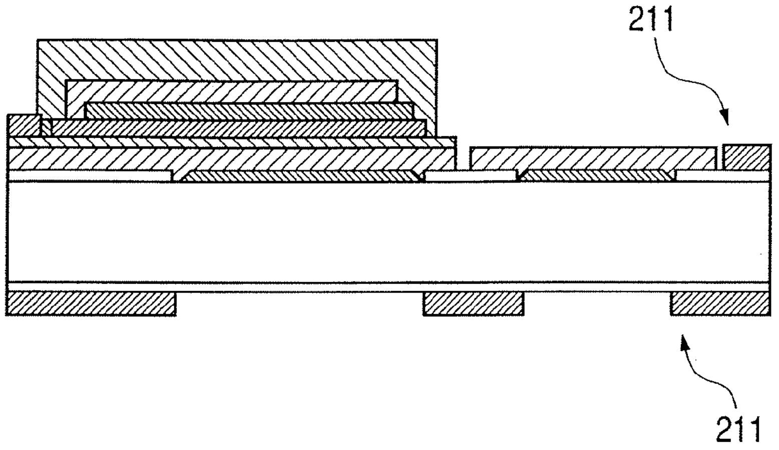
FIGS. 6A, 6B and 6C are views showing steps (9 ) to (11) in a flow of the method for producing the ink jet head of the present invention.

(9) An alkali-resistant film (HIMAL: manufactured by Hitachi Chemical) 211 was formed by coating and sintering. (FIG. 6A)

Figure 6B:
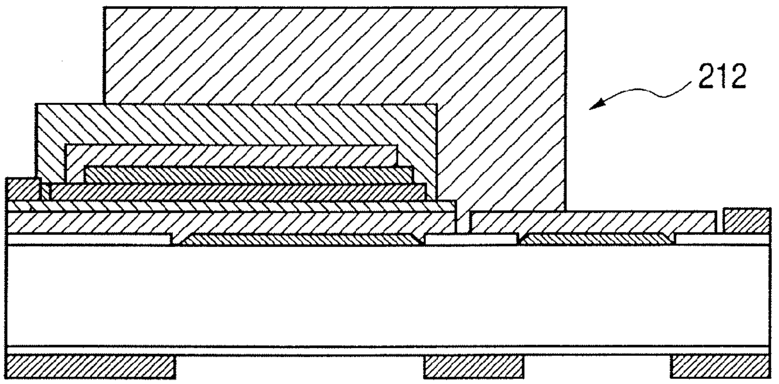

(10) As a photosensitive resin, polymethyl isopropenyl ketone (ODUR-1010: manufactured by Tokyo Oka Co.) was coated by 30 μm and patterned to form a liquid flow path mold material 212. (FIG. 6B)

Figure 6C:
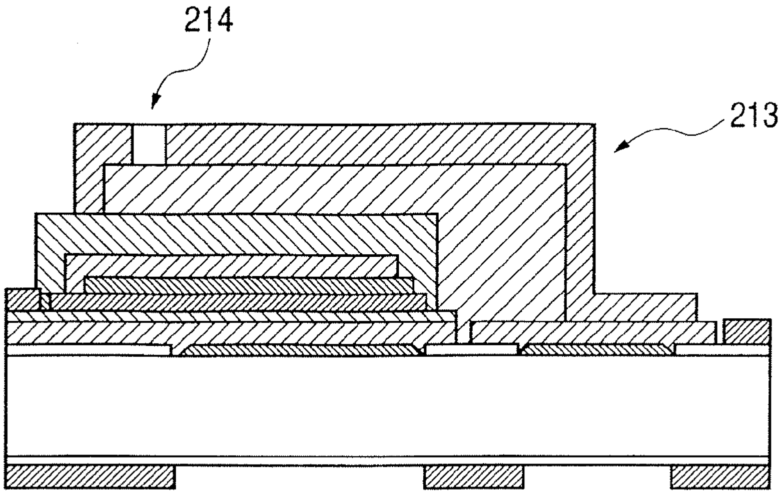

(11) Also a photosensitive resin layer 213 shown in Table 1 was coated by 12 μm and patterned to form a pressure generating chamber and a liquid discharge port 214. (FIG. 6C)

Figure 7A:
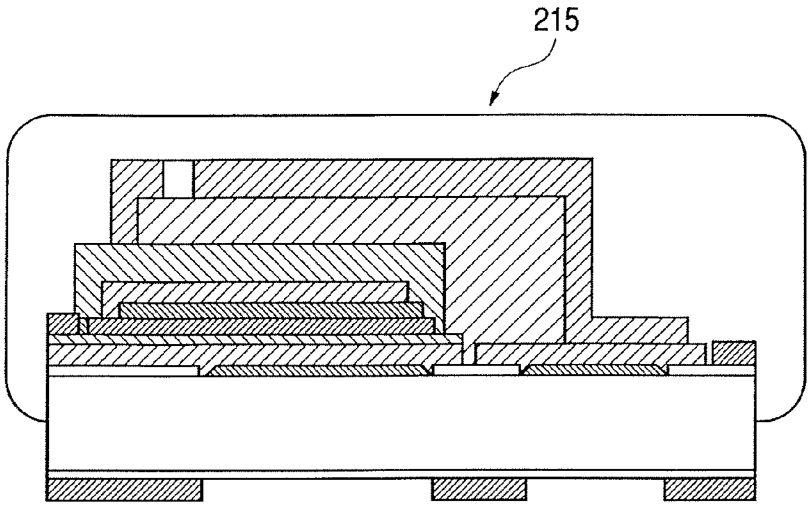
FIGS. 7A, 7B and 7C are views showing steps (12) to (14) in a flow of the method for producing the ink jet head of the present invention.

(12) In order to protect a nozzle forming surface, a protective film 215 was formed with a rubber-based resist (OBC: manufactured by Tokyo Oka Co.). (FIG. 7A)

(13) The HIMAL film and $SiO_2$ on the rear side of the nozzle were patterned to form a liquid supply aperture on the rear surface. The pattern was a parallelogram shape in a mirror image relationship with the sacrifice layer on the surface.

Figure 7B:
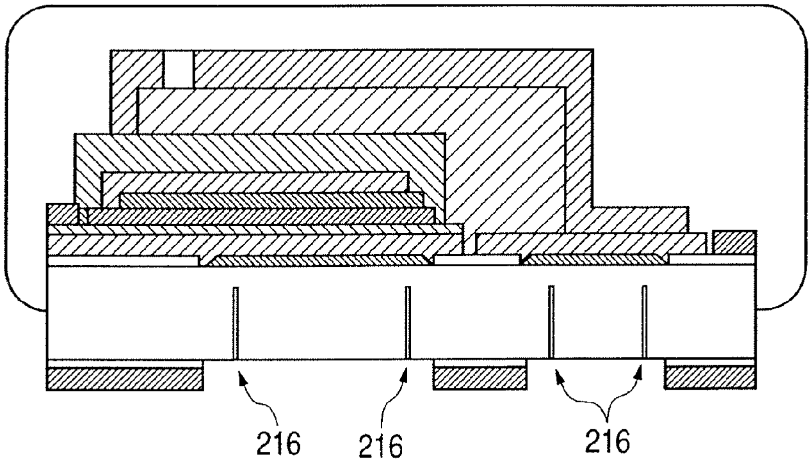

Then a non-penetrating etching leading hole 216 was formed with a 2nd harmonic wave of a YAG laser in the vicinity of an acute angle (rear plan view in FIG. 9) of the parallelogram on the rear surface. The hole had a diameter of 25 to 30 μm and a depth of 500 to 580 μm. (FIG. 7B)

(14) The substrate was anisotropically etched by immersion in a 21% aqueous TMAH solution. There were employed an etchant temperature of 83° C. and an etching time of 7 hours and 20 minutes. This was an over etch time of 10% with respect to a just etching time for the thickness of 630 μm of the substrate.

Figure 7C:
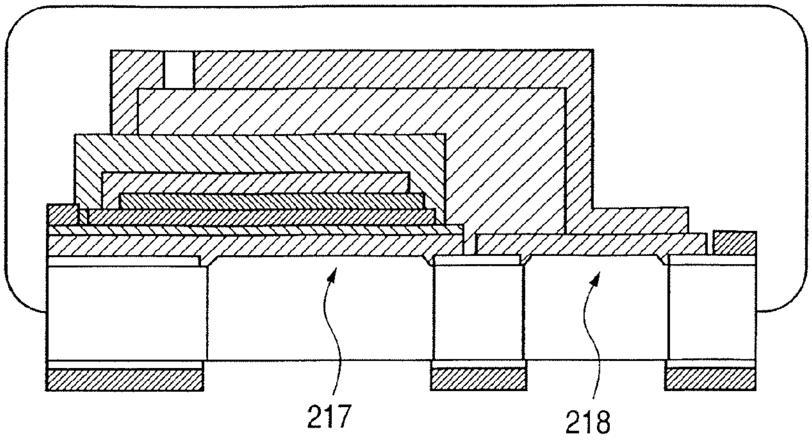

The etching proceeded to the sacrifice layer as illustrated, and stopped in front of the etching stop layer. The etching stop layer did not show a crack, and no intrusion of the etching solution could be observed in the flow path forming resin layer or in the nozzle portion. (FIG. 7C)

Figure 8A:
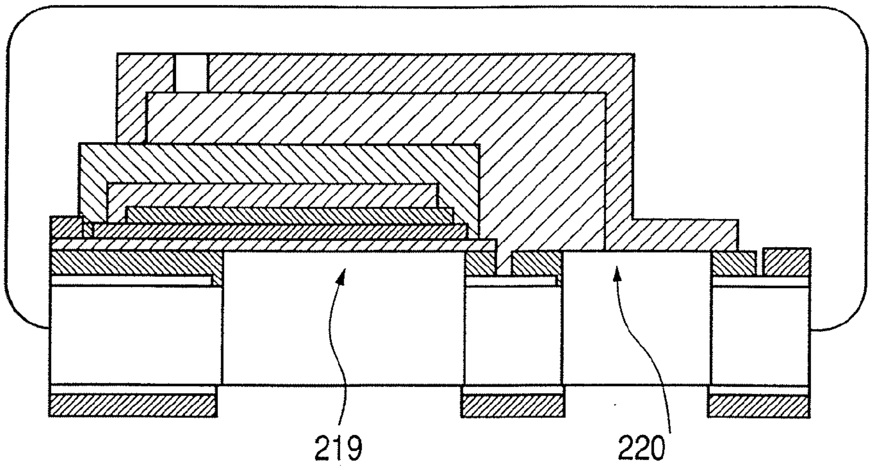
FIGS. 8A, 8B and 8C are views showing steps (15) to (17) in a flow of the method for producing the ink jet head of the present invention.

(15) Then SiN of the etching stop layer was eliminated by CDE process. Etching conditions were $CF_4/O_2$=300/250 ml (normal)/min., RF 800 W and a pressure of 33.33 Pa (=250 mtorr). (FIG. 8A)

Figure 8B:
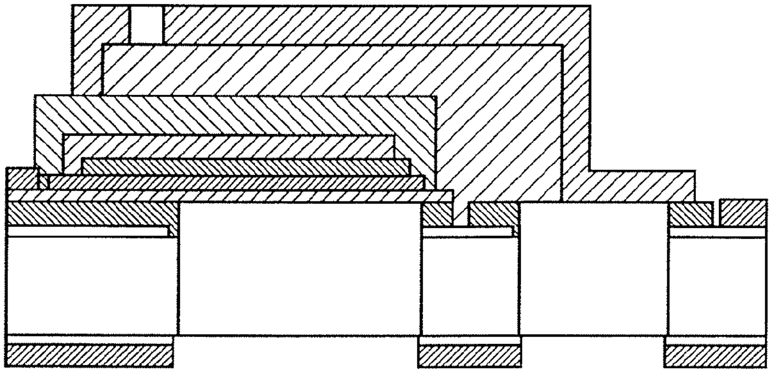

(16) After immersion in methyl isobutyl ketone, an ultrasonic wave was applied to remove the protective film. (FIG. 8B)

Figure 8C:
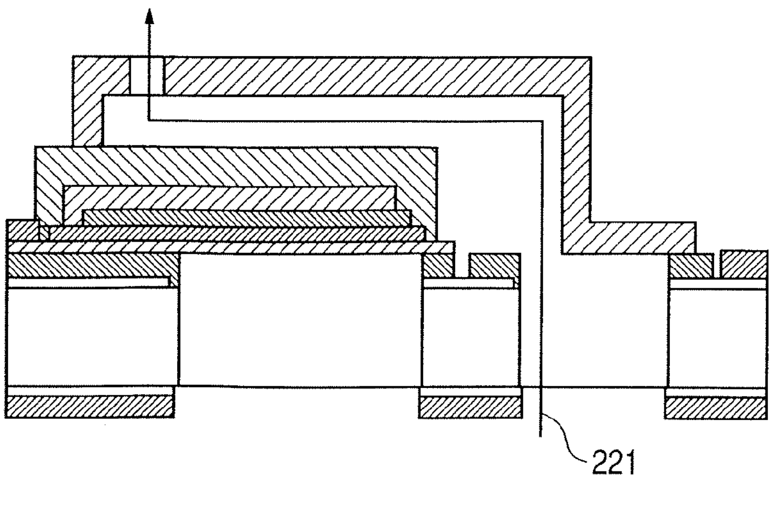
Figure 9:
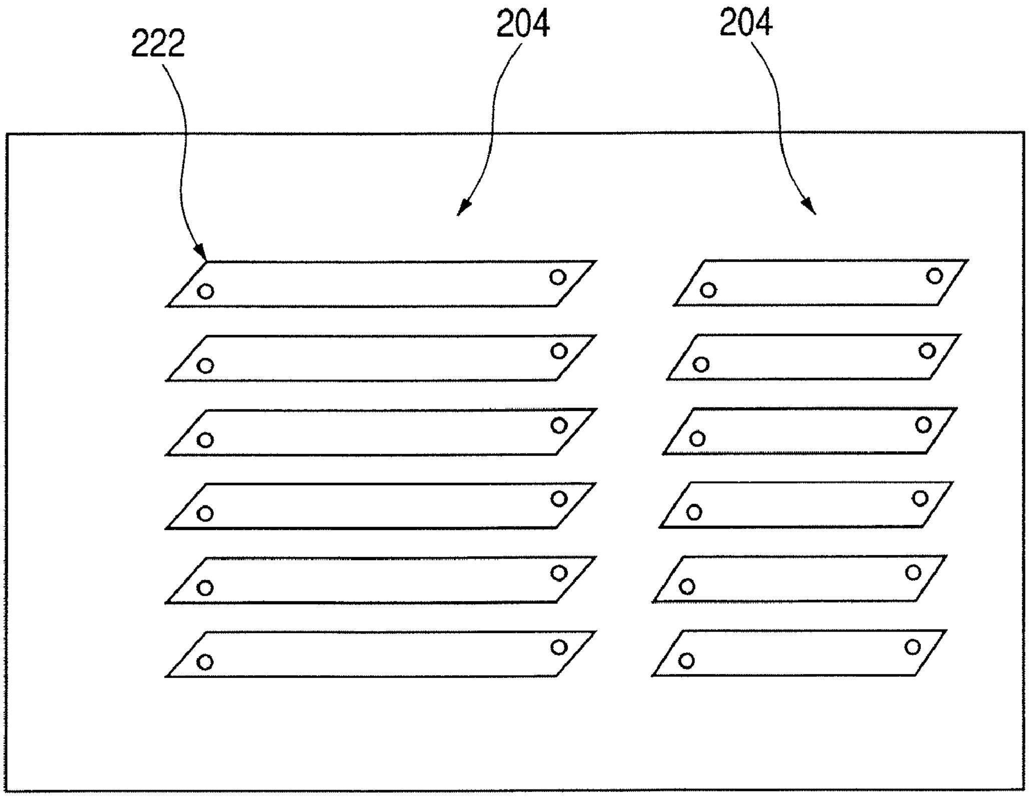
FIG. 9 is a view showing a step in a flow of the method for producing the ink jet head of the present invention.

(17) Finally an ultrasonic wave was applied in ethyl lactate to remove the flow path forming resin, whereby the liquid flow path 221 was formed and an ink jet head was completed. (FIG. 8C)

This ink jet head was used with an aqueous ink of a viscosity of 2 mPa·s (=2 cp) and a high-quality print without discharge failure could be obtained under conditions of 24 kHz, a liquid droplet of 12 pl and a width of 12.5 mm.

EXAMPLE 3

A process of another example of the present invention will be explained.

Steps of FIG. 4A to FIG. 6B were executed as in the example 2 to obtain a substrate bearing a piezoelectric element on a surface of a Si {110} wafer.

As a photosensitive resin, polymethyl isopropenyl ketone (ODUR-1010: manufactured by Tokyo Oka Co.) was coated by 30 μm and patterned to form a liquid flow path mold material 212.

Figure 10A:
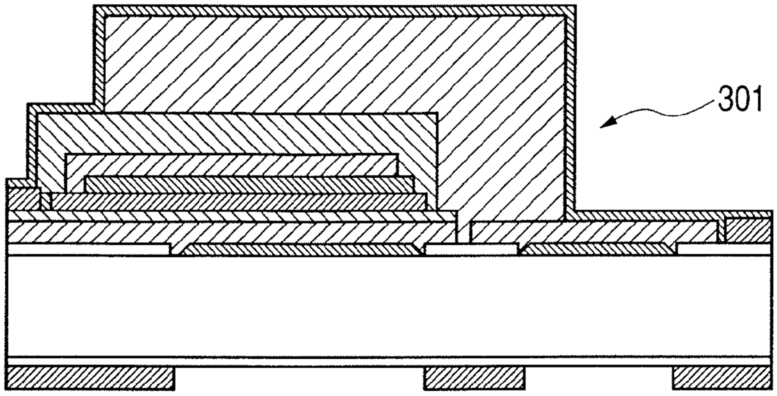
FIGS. 10A, 10B and 10C are views showing another example of the flow of the method for producing the ink jet head of the present invention.

Then, as shown in FIG. 10A, palladium colloid was coated and sintered to form a seed layer 301.

Figure 10B:
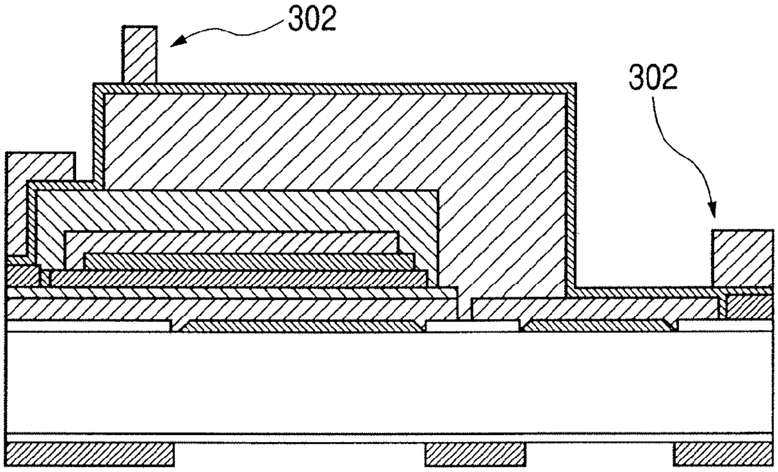

Then, as shown in FIG. 10B, a plating pattern was formed with a resist material (PMER P-LA 900: manufactured by Tokyo Oka Co.) 302.

Figure 10C:
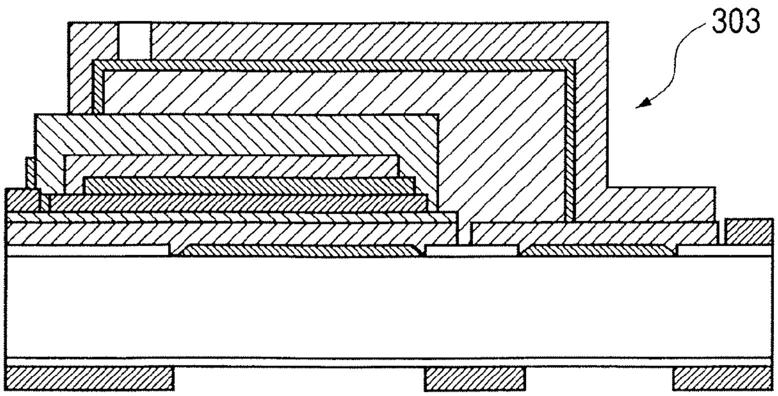

As shown in FIG. 10C, a pressure generating chamber 303 was formed with an electroless plating liquid (Enplate NI-426: manufactured by Meltex Co.).

Subsequent steps were executed in the same manner as in the example 2 to obtain an ink jet head.

This ink jet head was used with an ink of a viscosity of 3 mPa·s (=3 cp) utilizing toluene as a principal solvent, and a high-quality print without discharge failure could be obtained under conditions of 10 kHz, a liquid droplet of 10 pl and a width of 12.5 mm.

TABLE 1

| | | |
|---|---|---|
| epoxy resin | o-cresol type epoxy resin (Epicote 80H65; Yuka-Shell Co) | 100 parts |
| cationic photopolymerization initiator | 4,4'-di-t-butylphenyl iodonium hexafluoroantimonate | 1 part |
| silane coupling agent | A187 (Nippon Unicar Co.) | 10 parts |

EXAMPLE 4

Figure 11:
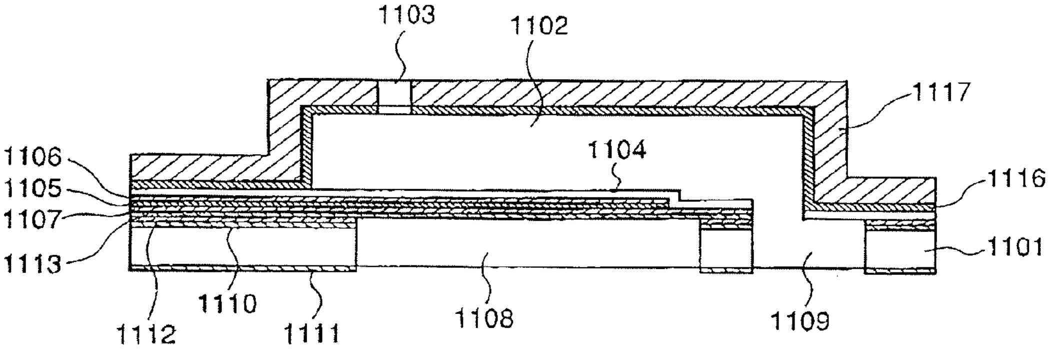
FIG. 11 is a schematic cross-sectional view showing still another example of the ink jet head produced by the producing method of the present invention.

FIG. 11 is a schematic cross-sectional view showing an embodiment in which a liquid discharge head produced by the method of the present invention is applied to an ink jet recording head.

On a substrate 1101, a free space 1108 behind a vibrating plate is formed. Above the free space, there are formed a vibrating plate 1104, a piezoelectric thin film 1105, an upper electrode 1106, a lower electrode 1107 etc. Also a pressure generating chamber 1102 is formed thereon. At a left-hand end, in FIG. 11, of the pressure generating chamber, there is formed a discharge port 1103. A pressure generated by a deformation of the vibrating plate on which the piezoelectric thin film is adjoined causes the ink to be discharged from the discharge port, and printed on a medium. At a right-hand-end of the pressure generating chamber, a communicating hole for ink supply (ink supply aperture) 1109 is formed and is connected with an ink tank.

Though it is structurally possible to cause the vibrating plate to act on plural individual pressure generating chambers, it is desirable, in order to achieve a finer image recording, that presence or absence of liquid discharge can be independently controlled for each nozzle. Consequently there is preferred a configuration in which the vibrating plate is independent for each pressure generating chamber.

In the following, the present example will be explained with reference to accompanying drawings. FIGS. 15A to 17C are views schematically showing steps of the producing method for the ink jet recording head of the present example. These steps will be explained in the following. Following steps (1) to (15) respectively correspond to FIG. 15A to FIG. 17C.

(1) A substrate 1101 is prepared. In the present invention, the substrate can be a Si substrate, a glass substrate or a plastic substrate, but a Si substrate is advantageously employed in consideration of an easy preparation of a highly-integrated high-density drive circuit by a fine working technology, and of an easy preparation of a satisfactory insulation film by oxidation. For forming a free space in the Si substrate, there can be employed a dry etching such as RIE or deep RIE (ICP), an anisotropic etching with tetramethyl ammonium hydride (TMAH) or potassium hydroxide (KOH), or a sand blasting, but the anisotropic etching is advantageously employed as it can easily achieve fine working and can process plural substrates at a time. The Si substrate is available in different face orientations such as {100} and {110}, but a substrate with a face orientation {110} is advantageously employed because a vertical anisotropic etching is possible. In this manner a highly integrated head can be prepared.

Figure 12:
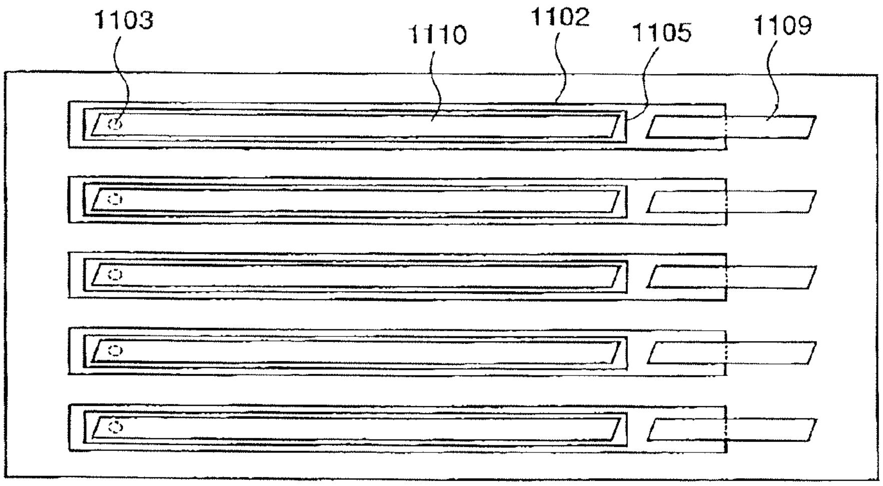
FIG. 12 is a schematic plan view showing still another example of the ink jet head produced by the producing method of the present invention.
Figure 13:
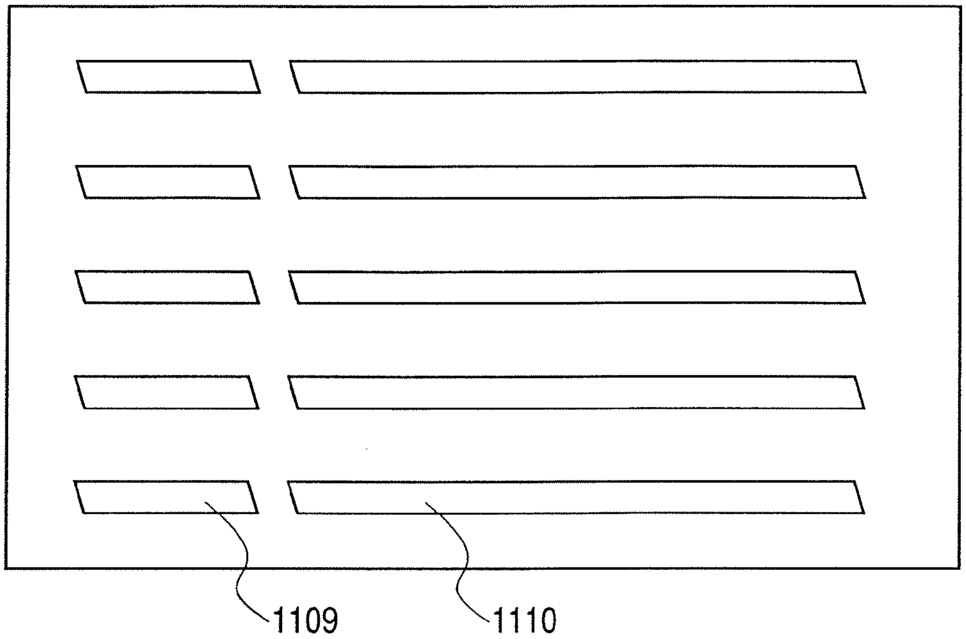
FIG. 13 is a schematic rear plan view showing still another example of the ink jet head produced by the producing method of the present invention.

On the Si substrate of a face orientation {110}, SiN or $SiO_2$ is formed by thermal oxidation or CVD. FIG. 12 is a schematic view showing a surface of the substrate. Desired etching mask layers 1110, 1111, for forming a free space 1108 and an ink supply aperture 1109, are formed on the top face and the rear face as shown in FIG. 12 by a photolithographic process. Patterns of the neighboring etching mask layers are arranged in an array, parallel to the face orientation {110}. Also in order to form the free space and the ink supply aperture vertically to the substrate, the pattern is formed in a parallelogram shape with an acute included angle of 70.5° and with longer sides and shorter sides of the parallelogram parallel to faces equivalent to {111}, in the same manner as a sacrifice layer to be explained later. FIG. 13 is a schematic view of the rear face of the substrate. Patterns are so formed as to correspond to those on the top face.

Figure 15A:
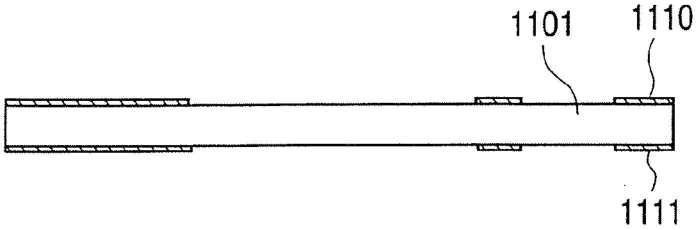
FIGS. 15A, 15B, 15C, 15D, 15E, 15F and 15G are views showing steps (1) to (7) in a flow of the method for producing the ink jet head of the present invention.

The top face of the substrate means a face on which drive circuits such as a vibrating plate and a semiconductor thin film are formed, and the rear face of the substrate means an opposite face. (FIG. 15A)

Figure 15B:
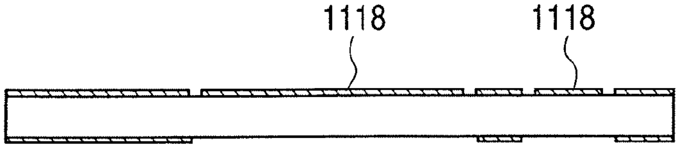

(2) A film of a material showing a large etching rate to an anisotropic etchant to be explained is formed and patterned to form a sacrifice layer 1118. W, Mo, Al, poly-Si etc. can be advantageously employed. When the etchant reaches the sacrifice layer with the proceeding of etching, since the sacrifice layer has a higher etching rate than in the Si substrate, a free space corresponding to the pattern of the sacrifice layer can be formed exactly within a short time. The pattern of the sacrifice layer is formed inside a pattern of the etching mask layer. (FIG. 15B)

Figure 15C:
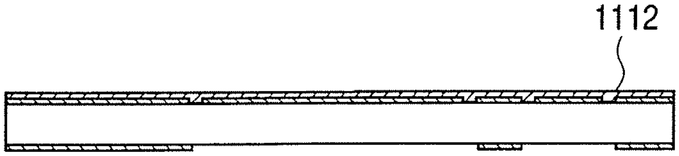

(3) On the top face of the substrate, SiN or $SiO_2$ constituting an etching stop layer 1112 is formed for example by CVD. The etching stop layer is provided in order to prevent that the drive circuit is attacked by the etchant. It is also possible to laminate films of two or more kinds, in order to regulate a film stress or to improve adhesion. (FIG. 15C)

Figure 15D:
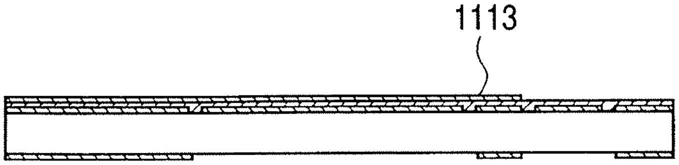

(4) A $SiO_x$ film is formed for example by CVD. The SiO, layer 1113 of this step is provided for preventing a damage to the drive circuit, when the etching stop layer formed in the preceding step is removed by etching in a later step. It is also possible to form the SiO, layer thicker, in such a manner that the $SiO_x$ layer formed in this step also functions as a vibrating plate to be explained later. (FIG. 15D)

Figure 15E:
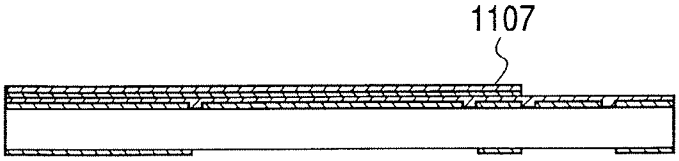

(5) A lower electrode 1107 is formed with a metal such as Pt or Ti. Also, though not illustrated, other drive circuits are formed by an ordinary semiconductor technology prior to a step (8). (FIG. 15E)

Figure 15F:
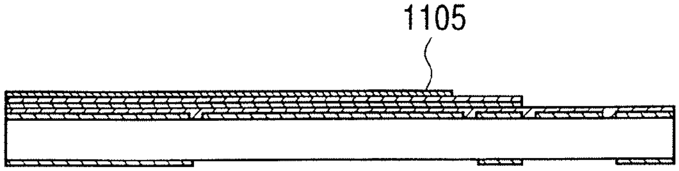

(6) On the lower electrode, a film of a piezoelectric material such as lead titanate zirconate (PZT) is formed for example by sputtering and is patterned to obtain a piezoelectric thin film 1105. (FIG. 15F)

Figure 15G:
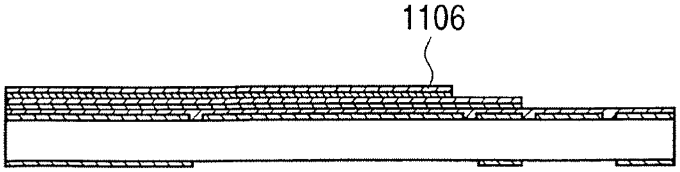

(7) On the piezoelectric thin film, an upper electrode 1106 is formed with a metal capable of withstanding a high temperature such as Pt or Ti. (FIG. 15G)

Figure 16A:
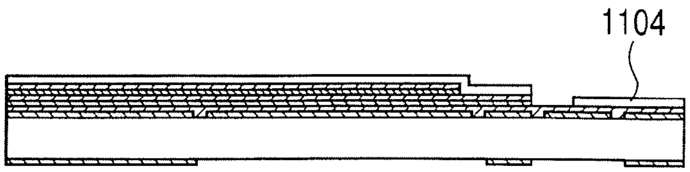
FIGS. 16A, 16B, 16C, 16D and 16E are views showing steps (8) to (12) in a flow of the method for producing the ink jet head of the present invention.

(8) In a portion where the electrodes and the piezoelectric thin film are formed, a film of $SiO_x$ or the like is formed for example by CVD to constitute a vibrating plate 1104. Even in case the aforementioned SiO, layer is used as the vibrating plate, it is preferable to form the $SiO_x$ layer or the like in this step, in order to protect the piezoelectric element and the drive circuit from the ink. (FIG. 16A)

Figure 16B:
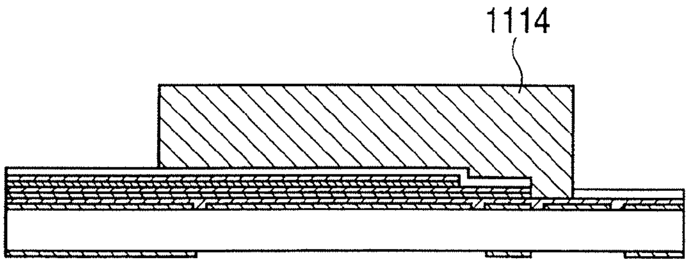

(9) There is formed a first pattern 1114, constituting a mold material which is to be removed later for forming a pressure generating chamber etc. It can be formed by a printing process or a photolithographic process, but a photolithographic process utilizing a photosensitive resin is desirable as it can form a fine pattern. The mold material is preferably of a material capable of a patterning of a thick film and removable later with an alkali solution or an organic solvent. The mold material can be a material of THB series (manufactured by JSR) or PMER series (manufactured by Tokyo Oka Co.). A following example employs PMER HM-3000, but such example is naturally not restrictive. A film thickness of 60 μm or less in case of a single coating or 90 μm or less in case of plural coatings is preferred in consideration of a film thickness distribution and a patterning property. (FIG. 16B)

Figure 16C:
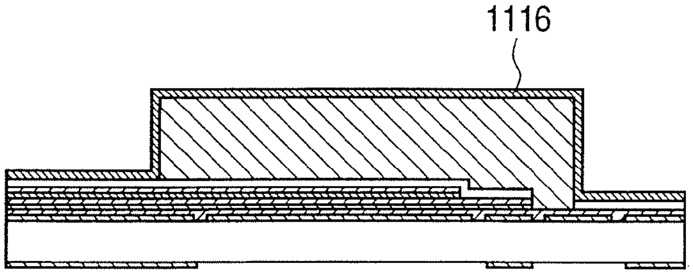

(10) On the first pattern, a conductive layer 1115 is formed, for example, by sputtering. As the conductive layer, Pt, Au, Cu, Ni, Ti etc. can be used. Since a fine pattern cannot be formed unless a good adhesion of a certain extent is attained between the resin and the conductive layer, it is also possible to form a film of Pt, Au, Cu. Ni, etc., after forming a film of another metal. Since the conductive layer has to be removable in a portion corresponding to the discharge port in a later step of eliminating the mold material, the conductive layer preferably has a thickness of 1500 Å or less, most preferably 1000 Å or less. A conductive layer thicker than 1500 Å may not be completely removable in the portion corresponding to the discharge port, in the step of eliminating the mold material. (FIG. 16C)

(11) On the first pattern bearing the conductive layer, there is formed a second pattern 1116 which is to be removed later to form the discharge port. The mold material can be a material of THB series (manufactured by JSR) or PMER series (manufactured by Tokyo Oka Co.). A following example employs PMER LA-900PM, but such example is naturally not restrictive and there can be employed any material capable of patterning of a thick film and removable later with an alkali solution or an organic solvent. A film thickness is preferably 30 μm or less since a higher patterning precision than in the first pattern is required. It is therefore preferable to prepare the first pattern and the second pattern with a total thickness of 120 μm or less.

Figure 16D:
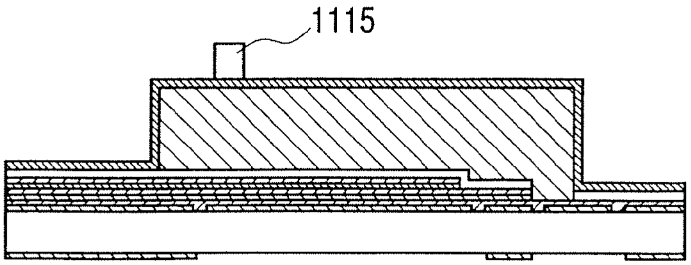

In order to efficiently utilize the force generated in the pressure generating chamber for a discharging power, each of the first pattern and the second pattern preferably has a tapered shape in which an upper face is smaller than a lower face. An optimum shape can be determined for example by a simulation. Such tapered shape can be formed by various methods, for example, in case of a proximity exposure equipment, by increasing a gap between the substrate and the mask. It can also be formed for example utilizing a gray scale mask. A fine discharge port can be easily formed by utilizing a ⅕ or 1/10 reduction exposure. Also instead of a tapered shape, a complex shape such as a spiral shape can be easily formed by utilizing a gray scale mask. (FIG. 16D)

(12) A flow path structure member including a pressure generating chamber and a discharge port is formed by a plating process. The plating process includes an electrolytic plating and an electroless plating, which can be suitably used in different ways. The electrolytic plating is advantageous in a low cost and an easy processing of the waste liquids. The electroless plating is advantageous in a good depositing property, a uniform film formation and a hard plated film with a high abrasion resistance. As an example of using these methods, it is possible to at first form a thick Ni layer by electrolytic plating, and then form a thin Ni-PTFE composite plated layer by electroless plating. Such method provides an advantage that a plated layer having films of desired characteristics can be formed inexpensively.

Figure 16E:
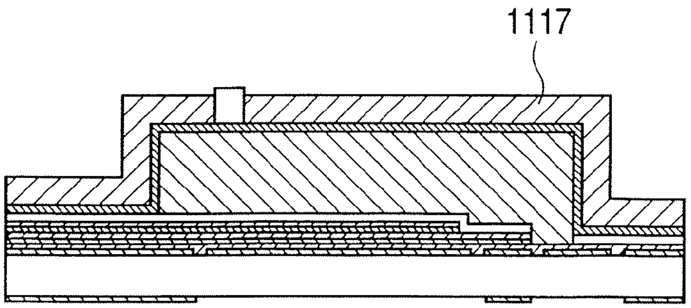

The plating can be a single metal plating or an alloy plating for example of Cu, Ni, Cr, Zn, Sn, Ag or Au, or a composite plating for depositing PTFE etc. Ni is employed advantageously, in consideration of chemical resistance and strength. Also for providing the plated film with a water repellent property, there is employed the Ni-PTFE composite plating as explained above. (FIG. 16E)

(13) In order to protect the top face of the substrate, prepared in the foregoing steps, from the etchant, a resin having an alkali resistance and removable later for example with an organic solvent is coated on the substrate, or the substrate is mounted on a jig which can bring the rear face alone in contact with the etchant.

Figure 14:
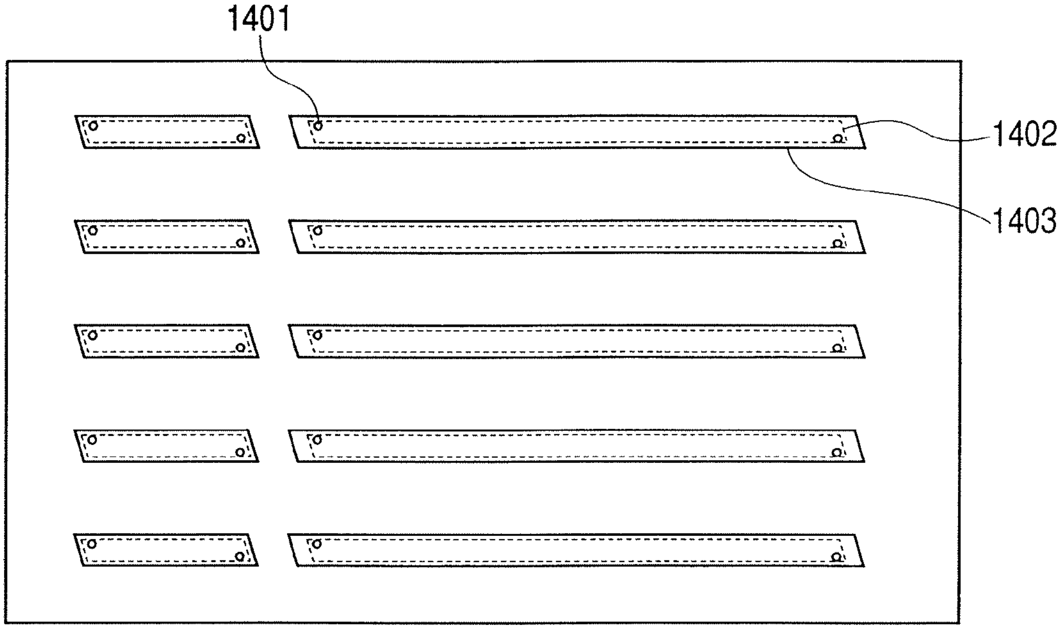
FIG. 14 is a schematic rear plan view showing still another example of the ink jet head produced by the producing method of the present invention.

Then a leading hole 1401 may be formed in a vicinity of an acute angle (rear plan view in FIG. 14) of the parallelogram on the rear surface, for example by a laser working. The leading hole suppresses an inclined {111} face generated from the acute angle of the parallelogram at the anisotropic etching. The leading hole is formed to a depth as close as possible to the etching stop layer. A depth of the leading hole is generally 60% or more of the thickness of the substrate, preferably 70% or more and most preferably 80% or more. However it should not penetrate the substrate.

By immersing the substrate in an etchant and executing an anisotropic etching so as to expose a {111} face, there can be formed a free space and an ink supply aperture having a parallelogram planar shape. An alkaline etchant includes KOH, TMAH etc., but TMAH is advantageously employed in consideration of the environmental issues.

Figure 17A:
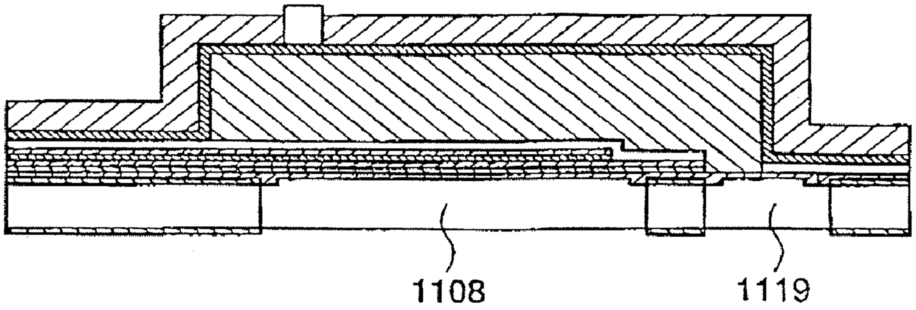
FIGS. 17A, 17B and 17C are views showing steps (13) to (15) in a flow of the method for producing the ink jet head of the present invention.

After the etching, an alkali-resistant protective film, if employed, is removed for example with an organic solvent. In case a jig is used, the substrate is detached from the jig. (FIG. 17A)

Figure 17B:
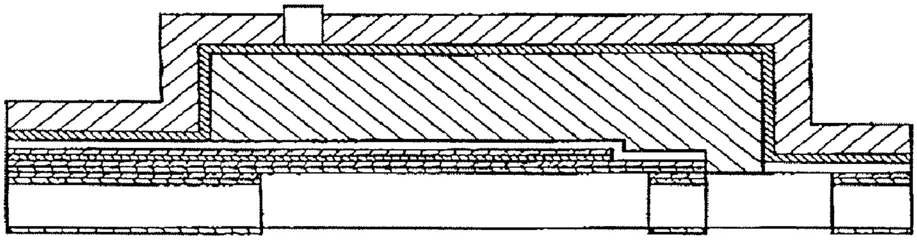
Figure 17C:
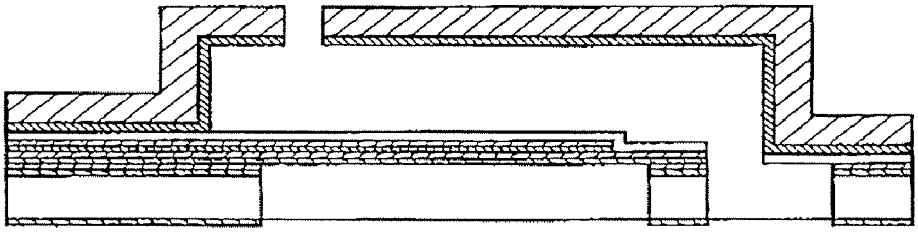

(14) SiN constituting the etching stop layer is removed for example by dry etching. (FIG. 17B)

Figure 18A:
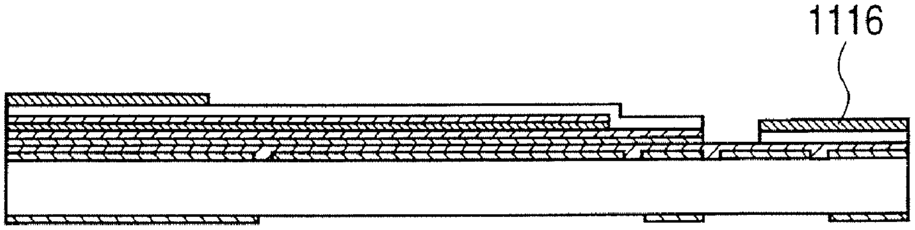
FIGS. 18A, 18B and 18C are views showing steps (1) to (3) in a flow of the method for producing the ink jet head of the present invention.
Figure 18B:
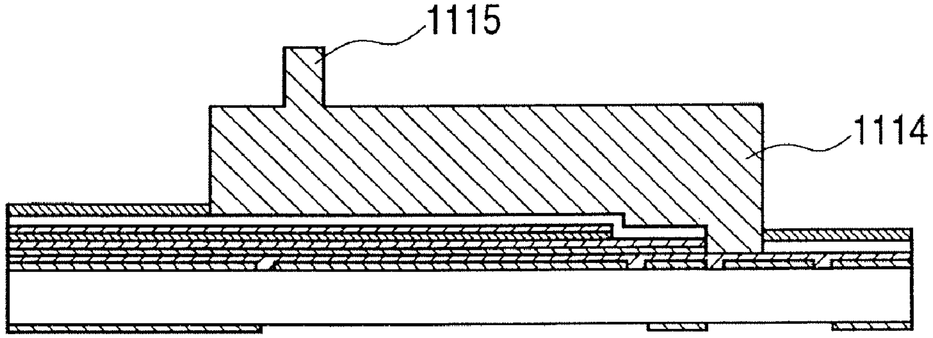
Figure 18C:
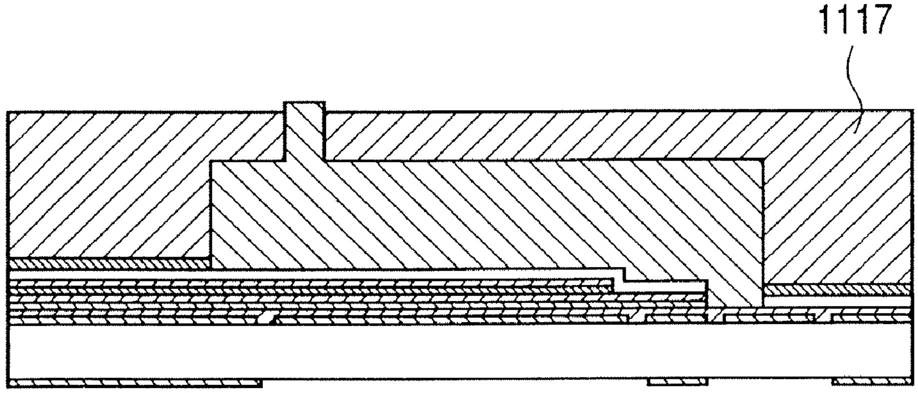

(15) The first pattern and the second pattern, constituting the mold materials of the flow path structural member including the pressure generating chamber and the discharge port, are removed with an alkali solution or an organic solvent. The conductive layer, formed in a portion corresponding to the discharge port, can be easily removed by using Direct Path (manufactured by Arakawa Chemical Industries Co.). In this operation, a Pine Alpha series (manufactured by Arakawa Chemical Industries Co.) can be utilized as a solvent. (FIG. 17C) The steps in FIGS. 16B to 16E are not restrictive but may be replaced by the steps (1) to (3) in FIGS. 18A to 18C. FIGS. 18A to 18C show a producing method of forming the first pattern and the second pattern after the formation of the conductive layer. These methods have respective advantages and disadvantages, and are therefore suitably employed according to the situation.

The producing method shown in FIGS. 15A to 17C has an advantage that the plating can be uniformly formed. The producing method shown in FIGS. 18A to 18C has an advantage that the process is simpler.

In this manner, the principal producing steps of the ink jet recording head, utilizing the liquid discharge head of the present invention, are completed.

A producing process, constituting a more specific example of the present example, will be explained with reference to FIGS. 15A to 17C. A 6-inch Si substrate, having a thickness of 635 μm and a face orientation {110}, was used as the substrate 1101. A $SiO_2$ layer of a thickness of 6 μm was formed by thermal oxidation on the top face and the rear face of the substrate- Desired etching mask layers 1110, 1111 for forming a free space and an ink supply aperture were formed by a photolithographic process. A poly-Si layer was formed by LPCVD and patterned to obtain a sacrifice layer 1118 of a thickness of 1000 Å. In this operation, the parallelogram was so formed that the longer sides thereof became parallel to the {111} face. Then SiN of a thickness of 1 μm constituting an etching stop layer and a $SiO_2$ layer of a thickness of 2000 Å were formed by CVD. A lower electrode 1107 constituted of Pt of a thickness of 1500 Å, a piezoelectric thin film of PZT of a thickness of 3 μm and an upper electrode 1106 of Pt of a thickness of 1500 Å were formed by sputtering and patterning. A vibrating plate 1104 was formed by depositing $SiO_2$ with a thickness of 4 μm by CVD and patterning. Process for producing other drive circuits is executed by an ordinary semiconductor process and will not, therefore, be explained.

On the substrate, PMER HM-3000PM (manufactured by Tokyo Oka Co.) was spin coated with a thickness of 60 μm as a mold material 1114 for the pressure generating chamber etc., and was patterned after drying. The mold material had a dimension, seen from the top side, with a shorter side of 92 μm and a longer side of 3 mm. The mold materials were arranged in a parallel array in a direction of the shorter side, with a pitch of 127 μm. Also the mold material was so formed as to adequately cover the ink supply aperture as shown in FIG. 11, thereby controlling the actual dimension of the ink supply aperture. In this manner it was possible to control a balance in the inertance between the discharge port side and the ink supply aperture side. Ti/Cu constituting a conductive layer 1116 were deposited with thicknesses of 250 Å/750 Å and were patterned. Ti was provided in order to improve adhesion of Cu to the substrate and to improve conductivity. PMER LA-900PM (manufactured by Tokyo Oka Co.), constituting a mold material for the discharge port, was spin coated with a thickness of 25 μm and patterned. The mold was exposed with an exposure equipment of proximity type, and a tapered profile was obtained by maintaining a gap of 120 μm between the mask and the substrate.

Then a Ni layer was formed by 18 μm with an electrolytic plating, and a Ni-PTFE composite plating layer was formed by 3 μm with an electroless plating.

Then, in order to protect the top face of the substrate, a cyclized rubber resin OBC (manufactured by Tokyo Oka Co.) was coated. Then a leading hole was formed by a laser working, in a vicinity of an acute angle portion of the parallelogram on the rear face. The leading hold had a depth of 80% of the thickness of the substrate. The substrate was subjected to an anisotropic etching for a predetermined time at 80° C. utilizing a 22 wt. % TMAH solution. After the anisotropic etching, OBC was removed with xylene, and the SiN etching stop layer 1112 was removed by a dry etching. Finally, the mold material was removed with Direct Path (manufactured by Arakawa Chemical Industries Co.). In this operation, Pine Alpha ST-380(manufactured by Arakawa Chemical Industries Co.) was employed as a solvent.

In the completed head, the discharge port had a dimension of 15 μm on an upper face and 30 μm on a lower face. The pressure generating chamber had a partition of 21 μm. The formed free space had a length of 700 μm along the longer side, while the ink supply aperture had a length of 500 μm along the longer side.

This head was used with an aqueous ink of a viscosity of 2 mPa·s (=2 cp), and a high-quality print without discharge failure could be obtained under conditions of 25 kHz, and a liquid droplet of 12 pl.

EXAMPLE 5

FIGS. 18A to 18C are schematic views showing a producing method of the example 5. A 6-inch Si substrate having a face orientation {110} was processed in the same manner as in the example 4, until the formation of a drive circuit. On the completed substrate, Ti/Cu constituting a conductive layer 1116 were deposited with thicknesses of 250 Å/750 Å and were patterned (FIG. 18A (step (1)). Then an operation of dripping PMER HM-3000PM (manufactured by Tokyo Oka Co.), for later forming a first pattern 1114 and a second pattern 1115 on the substrate followed by a baking at a predetermined temperature was repeated three times to obtain a thickness of 85 μm (three-times coating). It was then exposed at first with a mask of the first pattern (pressure generating chamber and flow path), then double-exposed with a mask of the second pattern (discharge port) and was developed (FIG. 18B (step (2)). By adjustments of exposures, the first pattern could be formed with a thickness of 60 μm while the second pattern could be formed with a thickness of 25 μm. In the exposure of the mold material 1115, there was employed exposure equipment of proximity type, and a tapered profile was obtained by maintaining a gap of 120 μm between the mask and the substrate. The mold material had a dimension, seen from the top side, of a shorter side of 92 μm and a longer side of 3 mm. The mold materials were arranged in a parallel array in the direction of the shorter side, with a pitch of 127 μm.

Then a Ni layer was formed by 60 μm with an electrolytic plating, and a Ni-PTFE composite plating layer was formed by 21 μm with an electroless plating. (FIG. 18C (step (3)) The subsequent steps were same as those in the Example 4.

In the completed head, the discharge port had a dimension of 15 μm on an upper face and 30 μm on a lower face. The pressure generating chamber had a partition of 35 μm. The formed free space had a length of 700 μm along the longer side, while the ink supply aperture had a length of 500 μm along the longer side.

This head was used with an aqueous ink of a viscosity of 2 mpa·s (=2 cp), and a high-quality print without discharge failure could be obtained under conditions of 25 kHz, and a liquid droplet of 12 pl.

What is claimed is:

1. A method for producing an ink jet head including, on an Si substrate having a face orientation {110}, a piezoelectric element for discharging an ink from a discharge port, a vibrating plate provided on said piezoelectric element and an ink flow path communicating with said discharge port so as to correspond to said piezoelectric element, a portion of the substrate corresponding to said piezoelectric element being formed with a space and a side wall of said space having a face orientation {111}, and the side wall of said space provided in the substrate being substantially perpendicular to a main surface of the substrate prior to formation of said space, the method comprising:

a step of providing a selectively etchable sacrifice layer on said substrate in a manner that the sacrifice layer is formed in a parallelogram shape with an acute included angle of 70.5° (viewing from above) and longer sides and shorter sides of the parallelogram are arranged parallel to faces equivalent to {111};

a step of forming an etching-resistant etching stop layer so as to cover said sacrifice layer;

a step of forming a film of said piezoelectric element on said etching stop layer;

a step of providing a mold material corresponding to said ink flow path on said vibrating plate;

a step of providing a wall material of said ink flow path so as to cover said mold material;

a step of eliminating the portion of said substrate corresponding to said piezoelectric element by a crystal axis anisotropic etching until said sacrifice layer is removed from a rear side of said substrate so as to form a space on the substrate; and a step of eliminating said mold material thereby forming said ink flow path.

2. An ink jet head producing method according to claim 1, wherein said ink flow path is so formed that a longitudinal component thereof is parallel to a face having a face orientation {111}.

3. An ink jet head producing method according to claim 1, wherein said ink flow path is formed in plural units along a direction perpendicular to a face of a face orientation {111}.

4. An ink jet head producing method according to claim 1, wherein, in the step of forming the space in the substrate, a hole communicating with said ink flow path is formed in said substrate, parallel to the formation of said space.

5. An ink jet head producing method according to claim 1, wherein, in the step of forming the space in the substrate, after the crystal axis anisotropic etching is executed, said etching stop layer is removed.

6. An ink jet head producing method according to claim 1, further comprising, between the step of providing the wall material of the ink flow path and the step of forming the space in said substrate, a step of providing a mold material for said discharge port on the mold material for the ink flow path.

7. An ink jet head producing method according to claim 1, wherein the wall material of said ink flow path is formed by a plating process.

* * * * *